Nov. 23, 1937. S. E. SPERRY 2,100,305
TYPOGRAPHICAL MACHINE
Filed Oct. 21, 1936 2 Sheets-Sheet 2
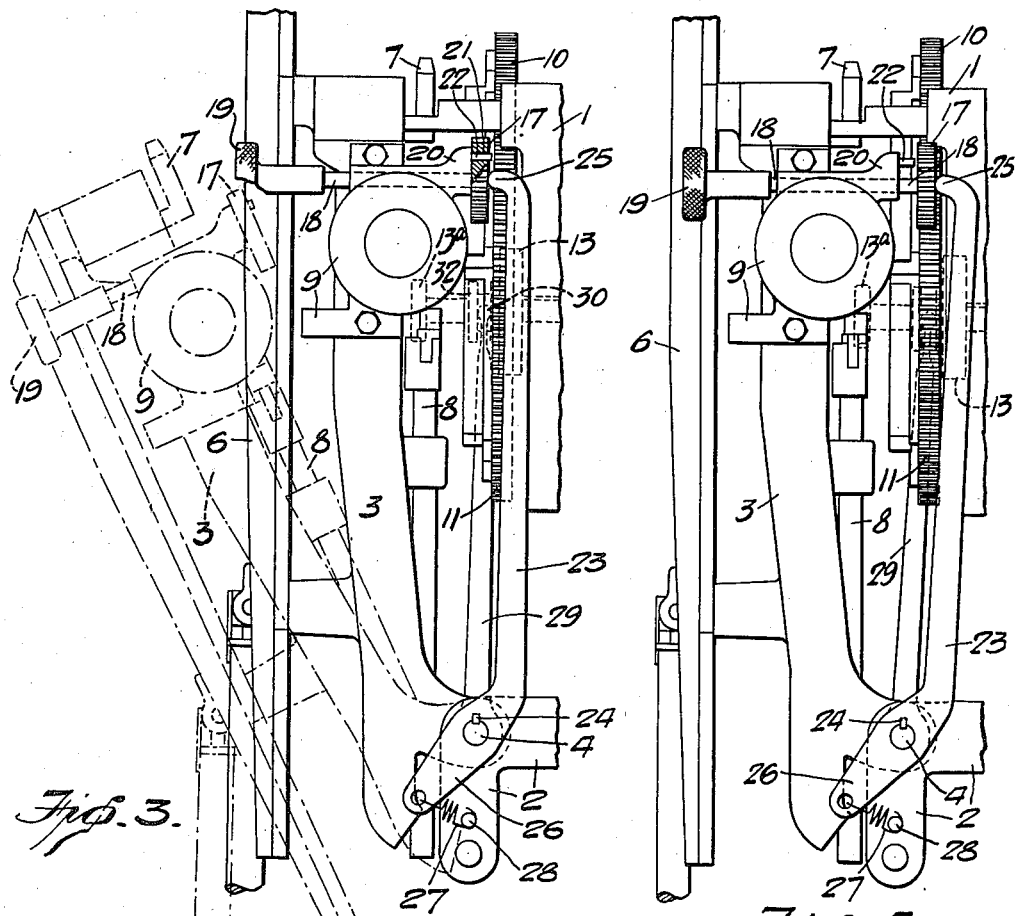
Fig. 3.
Fig. 4.
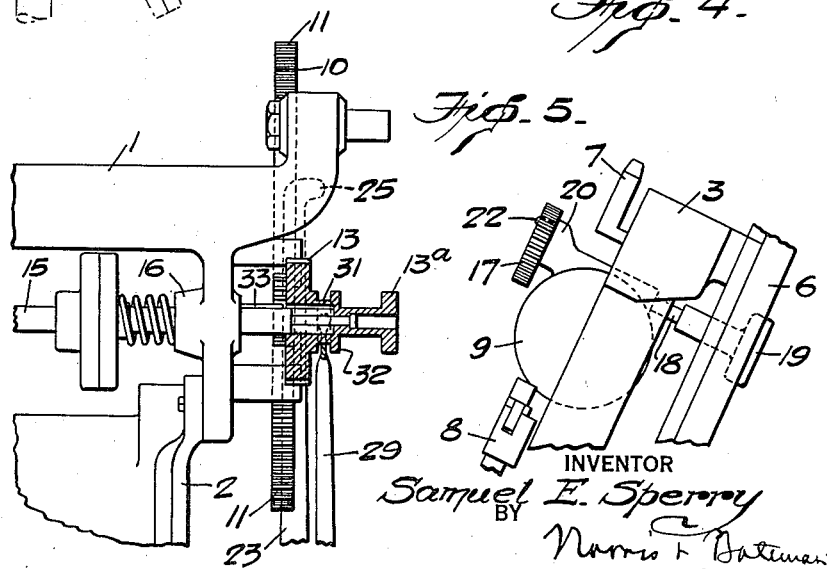
Fig. 5.
INVENTOR
Samuel E. Sperry
BY
Norris & Bateman
ATTORNEYS Patented Nov. 23, 1937

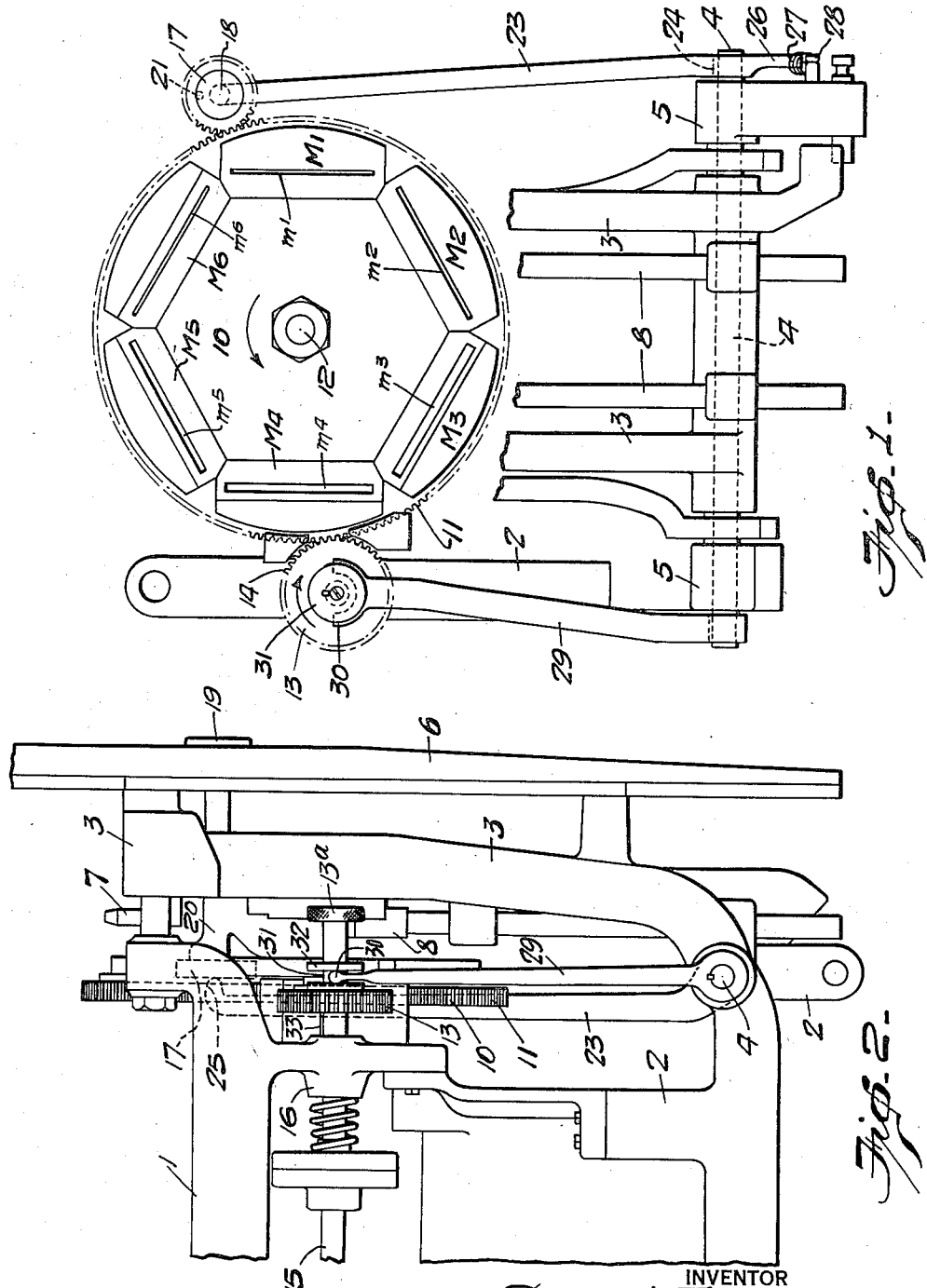

2,100,305

UNITED STATES PATENT OFFICE 2,100,305

TYPOGRAPHICAL MACHINE

Samuel E. Sperry, Hollis, N. Y., assignor to Intertype Corporation, Brooklyn, N. Y., a corporation of New York Application October 21, 1936, Serial No. 106,910

8 Claims. (Cl. 271—48)

The present invention relates to improvements in typographical machines of the general class shown and described in U. S. Letters Patent No. 436,532 granted September 16, 1890, employing a mold carrying wheel or disk to which composed lines of character bearing matrices are presented for the casting of type bars or slugs therefrom, and it relates more particularly to means for selecting for use one or another of a plurality of slug casting molds mounted on such wheel or disk.

The mold wheel or disk, in machines of this class as usually constructed, is provided with four molds and is driven by a pinion which engages teeth on the periphery of the mold disk, such pinion having means for coupling and uncoupling it with respect to its driving shaft, as disclosed for example in U. S. Letters Patent No. 758,103 granted April 26, 1904, the arrangement being such that when said pinion is coupled to its shaft, as by a pin in a collar on the shaft engaging in a hole in the face of the pinion, gear segments carried by a driving member on the main cam shaft of the machine rotate the mold disk first through 90° to bring the selected mold thereon from a normal position to casting position and thereafter through 270° to bring said mold back to normal position where the slug cast therein is ejected.

In such an arrangement, a gear ratio of 4 to 1 is required between the teeth on the driving pinion and those on the mold disk in order that the mold disk may be driven respectively through 90° and 270° by the actuating segments, and when four molds are provided on the mold disk, such gear ratio of 4 to 1 between the driving pinion and the mold disk is also suitable for the selection of different molds for use by manual rotation of the pinion when uncoupled from its driving shaft, each full rotation of the pinion by hand, when uncoupled from its driving shaft, serving to rotate the disk through 90° and thus bring the pinion back to its coupling relation with its driving shaft. If however the mold disk carries three, five or six molds, it must be rotated by the uncoupled pinion through 120°, 72° or 60° respectively in order to select an adjacent or succeeding mold on the mold disk, and in such cases obviously the 4 to 1 ratio between the driving pinion and mold disk and which is required for driving the mold disk respectively through 90° and 270° by its actuating segments regardless of the number of molds on the mold disk, would be wholly unsuitable for mold selecting purposes since for example rotation of the uncoupled pinion by hand through 60° to bring a succeeding one of six molds on the mold disk into operating position would leave the pin and hole coupling between the pinion and its driving shaft in unmated relation.

The primary object of the present invention is to provide, for mold selecting purposes, means, preferably in the form of a pinion, which is separate from the usual 4 to 1 ratio pinion employed for driving purposes, thus avoiding special coupling arrangements that would otherwise be necessary and enabling the employment of a mold selecting pinion bearing teeth of a number having the proper ratio to the number of teeth on the mold disk, according to the mold capacity of the latter, so that one full rotation of the particular mold selecting pinion chosen will rotate the mold disk through the distance between adjacent molds thereon, that is, through 60° for a six mold disk, 72° for a five mold disk, 90° for a four mold disk, and so forth.

The invention also has for an object to locate the mold selecting pinion in a position on the machine where it is more easily within the reach of the operator sitting at the keyboard of the machine than is the usual pinion heretofore employed both for driving the mold disk and for mold selecting purposes, the usual pinion however retaining the function of rotating the mold disk by hand as for example for mounting new molds thereon or for cleaning and inspection purposes.

To these and other ends, the invention consists in certain improvements and combinations and arrangements of parts all as will be hereinafter more fully described, the features of novelty being pointed out more particularly in the claims at the end of this specification.

In the accompanying drawings:

Figure 1 is a front elevation of the mold disk and cooperative driving pinion of a typographical or line casting machine, showing a mold selecting pinion according to the present invention applied thereto;

Figure 2 is a side elevation of a portion of the machine, showing the mold disk and its driving pinion as viewed from the left in Fig. 1, this figure showing parts of the machine associated with the mold disk and showing the driving pinion in normal position for driving the mold disk;

Figure 3 is a side elevation of a portion of the machine as viewed from the right in Fig. 1, this figure showing the mold selecting pinion according to the present invention in inoperative position, the usual vise frame being shown in its normally closed position in front of the mold disk by the full lines and shown in open position by the dot and dash lines;

Figure 4 is a view similar to Fig. 3 but shows the mold selecting pinion according to the present invention in operative position for rotation of the mold disk by hand to select one or another mold thereon for use and Figure 5 is a side elevation, partly in section, of the upper portions of the parts shown in Fig. 2, showing in detail the arrangement according to the present invention whereby the usual mold disk driving pinion may be uncoupled from its driving shaft when the usual vise frame of the machine is lowered for convenience in mounting new molds or for inspecting or cleaning purposes.

Similar parts are designated by the same reference characters in the different figures.

The invention in the present instance is shown applied to a typographical machine of the well-known class hereinbefore referred to, 1 and 2 representing portions of the stationary framework of the machine, 3 the usual vise frame pivotally mounted on a shaft 4 carried in bearings 5 on the machine frame 2 and serving to support the well-known vertically reciprocable first elevator 6 which transports the matrix lines to casting position and to support the usual line confining or vise jaws 7, the vise frame 3 also carrying the usual line justifying means 8 and the so-called knife block 9 which serves in the usual and well-known manner to trim the sides of the type bars or slugs cast in a mold on the mold disk as such slugs are ejected therefrom.

The mold wheel or disk 10, which is provided with a toothed periphery 11, is rotatably supported on a stub shaft 12 which may be carried in a bearing extending from a mold disk slide mounted in the machine frame in the usual and well-known manner, and the mold driving pinion 13 is provided with gear teeth 14 on its periphery to mesh with the teeth 11 on the mold disk, the pinion 13 being splined on a shaft 15 by a key 33, the shaft 15 being rotatable in a bearing 16 at the front of the machine frame, this shaft being also mounted in another bearing (not shown) at the rear of the machine, the shaft 15 being actuated by toothed or gear segments carried by a driving member on the main cam shaft of the machine and adapted respectively to rotate the mold disk first through 90° to bring the mold in use from a normal position to casting position and to thereafter rotate the mold disk through 270° to bring such mold back to normal position where the slug cast in said mold is ejected, this driving mechanism for the mold disk being well-known to those familiar with typographical or line casting machines of this class and shown and described in Letters Patent No. 436,532 hereinbefore referred to, so that illustration thereof is deemed unnecessary.

The mold disk 10, as shown in Fig. 1, is provided with six molds M'—M⁶ mounted symmetrically thereon, these molds having casting slots or cavities m'—m⁶ of different sizes. It is to be understood however that according to the present invention, any number of molds may be mounted on the mold disk, the particular feature of the present invention concerning the provision of novel means other than the mold driving pinion 13 for selecting one or another of a plurality of molds on the mold disk for use.

It will be understood by those familiar with machines of this class that, when selecting a particular mold on the mold disk for use according to the usual practice, the desired mold is brought to the vertical position at the right in Fig. 1 by uncoupling the driving pinion 13 from its driving shaft 15, by pulling the pinion forwardly by its knob or handle 13ª, and then turning the pinion by hand, such vertical position of the selected mold, indicated at the right in Fig. 1, being the ejecting position of such mold as well as the position which the mold in use must occupy in order that the segment which rotates the mold disk through 90° may bring the mold in use to a horizontal position at the top of the mold disk by rotation of the latter in the direction of the arrow, Fig. 1, for casting the type bar or slug, and the subsequent rotation of the mold disk through 270° will carry this mold in use from the casting position to the ejecting position from which it started. Since, for driving purposes through actuation by the mold disk turning segments, the ratio of gear teeth on the pinion 13 to those on the mold disk must be 4 to 1, it will be obvious that, for selecting a succeeding one of six molds on the mold disk which will require rotation of the latter through 60°, it would be necessary to turn the 4 to 1 ratio pinion 13 by hand, after uncoupling it from its driving shaft 15, through only a part of a full or complete revolution, and said pinion would not then be returned to its coupling relation with the shaft 15.

The present invention provides means other than the usual mold disk driving pinion 13 for mold selecting purposes, whereby the mold disk may be rotated to bring one or another of a various number of molds thereon into use without the necessity of providing special coupling arrangements between the mold driving pinion and its shaft suitable to mold disks of different capacities. Such mold selecting means according to the present invention comprises preferably a separate pinion 17 for turning the mold disk 10 in order to set any desired mold thereon into normal or operating position, namely, the vertical position at the right in Fig. 1. The pinion 17 is located preferably at the right hand side of the usual vise frame 6 of the machine as viewed from the front, and this pinion may be mounted in any suitable manner in the machine, it being shown in the present instance secured to the inner end of a shaft 18, the other end of this shaft being provided with a knob 19 for reciprocating and rotating it, the shaft 18 being mounted rotatably and movable axially in a suitable bearing bracket 20 which may be formed as an integral part of the knife block 9 which is carried on the vise frame 6. The pinion 17 is provided with a hole 21 for engagement with a pin 22 which is fixed in the rear end of the bearing 20.

A vertically disposed lever 23 is fixed at its lower end to the shaft 4, as by a key 24, the upper end of this lever being formed with a projection 25 which is engageable with the rear face of the pinion 17. The lower end of the lever 23 has an arm 26 which extends below the shaft 4 and is connected at one end to a tension spring 27, the other end of this spring being connected to a stud 28 secured in the portion 2 of the machine frame. The spring 27 acting on the lever 23 urges the projection 25 on the upper end thereof yieldingly against the rear face of the pinion 17 to retain said pinion normally in engagement with the pin 22. A vertically disposed lever 29 is keyed or otherwise fixed to the other end of the shaft 4, this lever being provided at its upper end with a yoke 30 which engages in an annular groove 31 formed in the hub 32 extending from the front face of the usual mold driving pinion 13. Since the levers 23 and 29 are both connected to the shaft 4 and are rotatable therewith, the spring 27 acting on the lever 23 will also act on the lever 29 and tend to maintain the driving pinion 13 normally in mesh with the teeth 11 on the mold disk 10, as shown in Fig. 2, and while the pinion 13 is in this position, the pinion 17 will be held by the lever 23 under the urge of the spring 27 out of engagement with the teeth on the mold disk 10, as shown in Fig. 3.

The pinion 17 is chosen to accord with the mold capacity of the mold disk on a given machine, the chosen pinion having teeth of a number which bears such a ratio to the number of teeth on the mold disk that one full revolution of said pinion will rotate the mold disk through an angle which corresponds to the distance between adjacent molds thereon.

In carrying out the invention, it is proposed that the mold capacity of the mold disk shall determine the tooth ratio between the mold selecting pinion 17 and the mold disk 10 in each instance so that each full revolution of the pinion chosen will rotate the mold disk through an angle corresponding with the distance between adjacent molds thereon. Thus, with a mold disk carrying six molds, the tooth ratio will be 6 to 1, with a mold disk carrying five molds the tooth ratio will be 5 to 1, and with a mold disk carrying four molds, the tooth ratio will be 4 to 1.

The operation of the mechanism as hereinbefore set forth in connection with a mold disk provided with six molds as shown, is as follows. Assuming that the mold M' standing in the vertical position at the right in Fig. 1 is no longer required for use and it is desired to select the next adjacent mold M² for use, the operator thrusts the knob 19 connected to the pinion 17 inwardly in opposition to the action of the spring 27, thereby moving the pinion 17 out of engagement with the pin 22 and into mesh with the toothed periphery of the mold disk. Simultaneously, through the levers 23 and 29, the mold driving pinion 13 will be moved rearwardly out of engagement with the toothed periphery of the mold disk 10 as indicated by the dotted lines in Fig. 4, the pinion 13 sliding rearwardly on its driving shaft 15 but being maintained normally against rotation on said shaft by the key 33. The operator may now turn the pinion 17 by hand, and after one complete revolution thereof, the hole 21 in this pinion will come into alinement with the pin 22 and it will reengage with said pin under the influence of the spring 27 acting on the lever 23, when the rearward pressure on the knob 19 is released. At the same time, the driving pinion 13 will be returned to its normal forward position under the action of the spring 27, thereby reengaging with the toothed periphery of the mold disk. Since the pinion 17 bears a tooth ratio of 6 to 1 with respect to the mold disk, one complete revolution of this pinion will rotate the mold disk through 60°, which is the distance between the adjacent molds M' and M². If it should be desired to set the mold M³ into the normal position previously occupied by the mold M', it will be merely necessary for the operator to thrust the knob 19 rearwardly a second time and to turn the pinion 17 by hand through another complete revolution and thus rotate the mold disk through a total angle of 120°, which will bring the mold M³ into position for use.

In order to enable the mold disk to be rotated conveniently without grasping the mold disk itself at such times when the usual vise frame 3 is opened or lowered to the position indicated by the dot and dash lines in Fig. 3 or as shown in Fig. 5, the mold driving pinion 13 may be pulled forwardly on its shaft 15 to advance it from the position shown in Fig. 2 to that shown in Fig. 5. When the pinion 13 is advanced to the position shown in Fig. 5, it will be out of engagement with the key 33 which connects it to the shaft 15, and the pinion 13 will then be freely rotatable on the shaft 15, although still in mesh with the toothed periphery of the mold disk, and this pinion may then be rotated by turning the knob 13ª by hand, and the driving pinion 13 may thus be used to turn the mold disk when, while the vise frame 3 is in its lowered position, the pinion 17 cannot be used. Such turning of the mold disk by the pinion 13 while the vise frame is in its lowered position is convenient for the purposes of exchanging molds on the disk or for cleaning or inspection.

I claim as my invention:

1. In a typographical machine having a toothed rotatable mold disk carrying a plurality of slug casting molds and a driving pinion movable into and out of mesh with said disk and cooperative with said disk when in mesh therewith for rotating it to bring a mold in position thereon for use into slug casting and ejecting positions, a mold selecting pinion having a number of teeth thereon of a ratio to the number of teeth on said disk differing from the ratio of the number of teeth on the driving pinion and on the disk and corresponding with the number of molds on the disk, said mold selecting pinion being normally disengaged from the disk but movable into engagement therewith to rotate said disk and thereby bring another mold thereon into position for use, and means operative upon such engagement of the mold selecting pinion with the disk to disengage the driving pinion therefrom.

2. In a typographical machine having a toothed rotatable mold disk carrying a plurality of slug casting molds and a driving pinion adapted to normally mesh therewith and operable to rotate said disk to bring a mold in position thereon for use into slug casting and ejecting positions, a mold selecting pinion movable into and out of engagement with the teeth on said disk and operable when engaged therewith to rotate the latter to bring another mold thereon into position for use, and a controlling connection between said pinions whereby engagement of the mold selecting pinion with the disk compels disengagement of the driving pinion therefrom and thereby prevents rotation of the disk by the selecting pinion from affecting the operative relation between the disk and the driving pinion.

3. In a typographical machine having a toothed rotatable mold disk carrying a plurality of slug casting molds and a driving pinion movable into and out of mesh with the teeth on said disk and operable to rotate the latter to bring a mold in position thereon for use into slug casting and ejecting positions, a mold selecting pinion movable into and out of mesh with the teeth on said disk and operable to rotate the latter to bring another mold thereon into position for use, and controlling means operative to move one of said pinions out of mesh with said disk when the other pinion is moved into mesh therewith.

4. In a typographical machine having a toothed rotatable mold disk carrying a plurality of slug casting molds and a power driven pinion movable into and out of mesh with the teeth on said disk and operable to rotate the latter both manually and by power to bring a mold in position thereon for use into slug casting and ejecting positions, a mold selecting pinion movable into and out of mesh with the teeth on said disk and operable manually to rotate the latter to bring another mold thereon into position for use, and connections between said pinions for moving them simultaneously one into and the other out of mesh with the teeth on the disk and for preventing manual rotation of the disk by the driving pinion.

5. In a typographical machine having a toothed rotatable mold disk carrying a plurality of slug casting molds, a driving shaft having a key thereon, a driving pinion slidable on said shaft and key into mesh with said disk to rotate it by power and thereby present a mold in position thereon for use at slug casting and ejecting positions and slidable on said shaft and key out of mesh with said disk to permit rotation thereof independently of the pinion, said pinion being also slidable on said shaft to a position beyond said key while the pinion remains in mesh with said disk whereby said pinion will be rotatable freely on said shaft for manual rotation of said disk.

6. In a typographical machine having a toothed rotatable mold disk carrying a plurality of slug casting molds and a driving pinion of a given ratio to the disk movable into and out of mesh with the teeth thereof and operable to rotate the latter to bring a mold in position thereon for use into slug casting and ejecting positions, a mold selecting pinion of a different ratio to the disk movable into and out of mesh with the teeth thereof and operable to rotate the latter to bring another mold thereon into position for use, and controlling means operative to move one of said pinions out of mesh with said disk when the other pinion is moved into mesh therewith.

7. In a typographical machine having a toothed rotatable mold disk carrying a plurality of slug casting molds and a vise frame adapted to swing open and closed in front of the mold disk, a driving pinion cooperative with said disk for rotating it either manually or by power to bring a mold in position thereon for use into slug casting and ejecting positions, a mold selecting pinion mounted on the vise frame and engageable with the teeth on the disk when said frame is closed to rotate the disk to bring another mold thereon into position for use, and connecting means between said pinions for preventing manual rotation of the disk by the driving pinion except when said vise frame is in open position.

8. In a typographical machine having a toothed rotatable mold disk carrying a plurality of slug casting molds and a vise frame adapted to swing open and closed in front of the disk, a driving pinion operable when said vise frame is either closed or open to rotate the disk to present a mold selected for use at slug casting and ejecting positions, a mold selecting pinion mounted on the vise frame and engageable with the disk when the vise frame is closed to rotate the disk to select another mold thereon for use, and a device cooperative with the selecting pinion when the vise frame is closed to prevent manual rotation of the disk by the driving pinion and released when the vise frame is opened to permit such rotation of the disk by the driving pinion.

SAMUEL E. SPERRY.